United States Patent [19]

Prosky

[11] 4,158,965

[45] Jun. 26, 1979

[54] ELECTRONIC THERMOMETER WITH HEAT CONDITIONED PROBE

[75] Inventor: Howard S. Prosky, Denver, Colo.

[73] Assignee: Electromedics, Inc., Denver, Colo.

[21] Appl. No.: 867,125

[22] Filed: Jan. 5, 1978

[51] Int. Cl.² ............................................. G01K 7/24
[52] U.S. Cl. .............................................. 73/362 AR
[58] Field of Search ................................... 73/362 AR

[56] References Cited

U.S. PATENT DOCUMENTS

| 3,791,214 | 2/1974 | Keith | 73/362 AR |
| 3,828,332 | 8/1974 | Rekai | 73/362 AR |
| 3,832,902 | 9/1974 | Usami | 73/362 AR |

*Primary Examiner*—S. Clement Swisher

[57] ABSTRACT

A probe of an electronic thermometer, to which a temperature sensing element is attached, is conditioned with heat energy whereby the temperature of the probe is changed to approximately the temperature of the environment whose temperature is to be measured. A thermistor is thermally attached to the probe and provides a measurable electrical characteristic related in a predetermined manner to the temperature experienced by the thermistor. An auxiliary current source supplies a current to the thermistor of sufficient magnitude so that the thermistor acts as a heating element for raising the temperature of the probe. Heat energy is supplied to the probe for a predetermined time or until the temperature of the probe reaches a predetermined limit. The flow of auxiliary current is terminated and the temperature of the probe and its attached thermistor are allowed to equalize to the temperature of the environment. Thereafter, the temperature of the environment is electrically determined from the measurable electrical characteristic of the thermistor. Control of the auxiliary current source and the temperature calculation is achieved from a microprocessor based computer.

21 Claims, 3 Drawing Figures

ELECTRONIC THERMOMETER WITH HEAT CONDITIONED PROBE

FIELD OF THE INVENTION

This invention relates to temperature measurement, and more particularly to an electronic thermometer which more rapidly equalizes the temperature of its temperature measuring element to the temperature of the environment to be measured. The electronic thermometer may be effectively utilized in clinical and medical applications for measuring the temperature of human beings.

BACKGROUND OF THE INVENTION AND BRIEF DESCRIPTION OF PRIOR ART

Many prior art electronic thermometers employ thermistors as transducers for determining the temperature of the environment whose temperature is being measured. In clinical thermometers, a thermistor is attached to a probe member of the thermometer, and the probe is inserted into a body cavity such as the mouth of a human being whose temperature is being measured. Once inserted the probe must remain in place for a sufficient time to allow the body tissue to heat the thermistor and probe to the temperature of the body tissue. Until the probe reaches a temperature which is equivalent to the body temperature, the probe remains at a lower temperature than that of the individual. Measuring the temperature before the probe has reached a temperature equalized with that of the environment will result in an inaccurate temperature reading, typically a low temperature reading.

The amount of time that the probe must remain in the body cavity or in any other environment depends on the thermal time constant of the probe. The thermal time constant is a measure of the time required for a particular object to absorb or expel a quantity of heat, and therefore represents a measure of the speed with which heat energy can be transferred by the object. Typically, the time constant of the thermistor is much less than the time constant of the probe, on the order of ten times less, but because the thermistor is thermally attached to the probe the time required for the thermistor temperature to equalize to that of the environment is essentially dependent upon the thermal time constant of the probe.

Different prior art techniques have been utilized to predict the final temperature before the thermistor has actually reached a temperature equalized with that of the environment. Electronic thermometers of this type are known as predicting thermometers and have been typically used to attempt to reduce the time necessary for accurately taking temperature of human beings. The prior art predicting thermometer may employ an electronic race circuit or some other type of compensation circuit which attempts to offset the actual measured temperature by a factor intended to compensate for the thermal time constant of the probe. The problems with predicting thermometers are that these compensation arrangements do not accurately simulate the individually different physiological characteristics and responses of various different people. Predicting thermometers also present problems in their calibration. Typically, the thermometer is calibrated in an oil or water bath which has a much better thermal conductivity than the mouth or other body cavity. The compensation circuits react differently in oil or water baths than in the body cavity of the human being to make accurate calibration for human use difficult or impossible.

A direct reading thermometer is one which directly measures the temperature without use of compensation or predicting arrangements. The well known mercury thermometer is one example of a direct reading thermometer. Direct reading thermometers can be accurately calibrated since the temperature they measure is the same temperature as the environment. Of course, the disadvantage of the prior art direct reading thermometer is that it requires a predetermined time of contact with the environment during which the temperature of the thermometer equalizes with that of the environment.

Other limitations and disadvantages of prior art electronic thermometers are known and appreciated, and limited solutions to some of these problems may have been achieved. In general, however, the various factors, problems, limitations and disadvantages present in the prior art should become more fully appreciated and recognized in light of the improvements and teachings of the present invention.

SUMMARY OF THE INVENTION

The general objective of this invention is to provide a new and improved electronic thermometer which significantly reduces the amount of time required to obtain an accurate temperature reading. Another objective of this invention is to provide a direct reading electronic thermometer which significantly reduces the amount of time the human individual is required to keep the probe or temperature measuring element in contact with an environment or within a body cavity. Another objective of this invention is to provide a new and improved electronic thermometer which provides more accurate temperature readings in less time than has previously been required.

In accordance with its objectives and general aspects, the invention employs means for conditioning the probe member of an electronic thermometer with heat energy to change the temperature of the probe to a temperature generally approximating the temperature of the environment to be measured. An electronic element such as a thermistor is positioned on the probe, and the electronic element supplies the heat energy for conditioning the probe. Preferably, an auxiliary current source selectively supplies auxiliary current of sufficient magnitude to the thermistor to generate heat for raising the temperature of the probe. The auxiliary current source is selectively controlled with respect to the time duration during which the probe is heated, and with respect to the amount of heat energy added to the probe according to the probe temperature. After the probe has been conditioned in a predetermined manner, the flow of auxiliary current through the thermistor is terminated, and a temperature measuring process and calculation is effected.

A more complete understanding of the invention and its manner of achieving the objectives can be obtained from the following description of a presently preferred embodiment of the invention taken in conjunction with a drawing consisting of a number of figures, and from the appended claims.

DESCRIPTION OF PREFERRED EMBODIMENT

Figure 1:
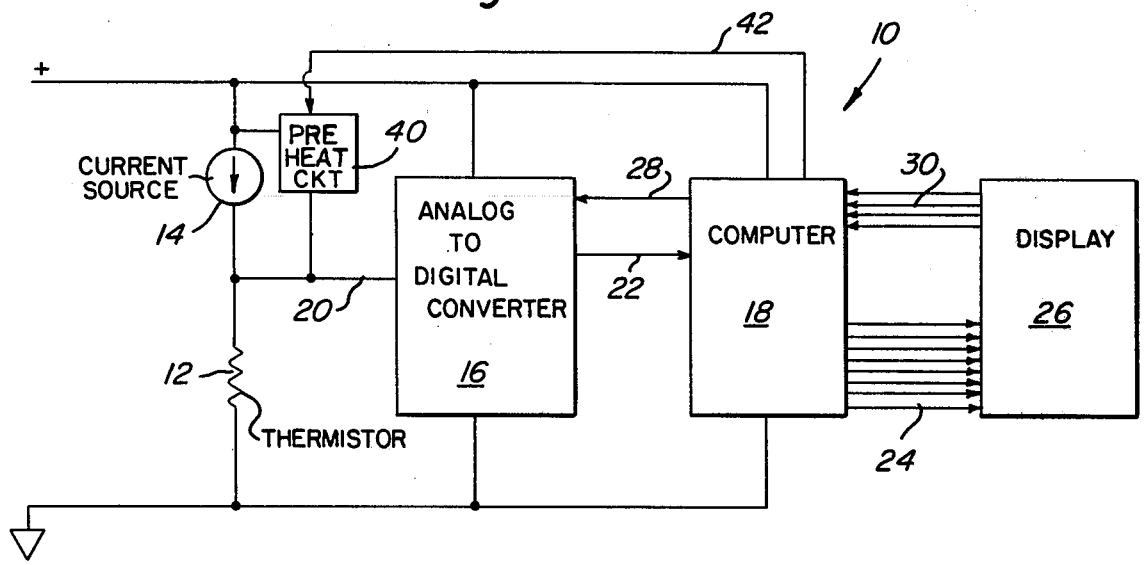
FIG. 1 is a generalized block diagram illustrating the apparatus, method and system of an electronic thermometer with a heat conditioned probe of the present invention.

Apparatus 10 shown in FIG. 1 illustrates an electronic thermometer with a heat conditioned probe, as well as the method and system of the thermometer. The apparatus 10 employs an electronic transducer, such as a thermistor 12, which is to be positioned in an environment for the purpose of sensing the temperature of that environment. The transducer possesses an electrical characteristic which responds or varies in a pedetermined manner to the temperature which is sensed. In the case of the thermistor 12, it possesses a resistance characteristic which typically varies in a predetermined nonlinear relationship with its temperature. A constant current source 14 supplies a measurement current which is directed through the thermistor 12, thereby creating a voltage across thermistor 12 directly related to its resistance. Due to the predetermined relationship between the temperature of the thermistor 12 and its resistance, it is readily understood that the voltage across the thermistor 12 varies in predetermined relation with the temperature of the thermistor.

To calculate an equivalent temperature of that temperature sensed by the thermistor 12, an analog to digital converter 16 and a microprocessor based computer 18 are employed in the apparatus 10. Conductor 20 supplies the voltage across the thermistor 12 as input to the analog to digital converter 16. The converter 16 converts the analog input voltage to a digital output voltage which is supplied on conductor 22 to the computer 18. The computer 18 includes a memory for storing information relating to and approximately defining the resistance variation of the thermistor 12 with respect to its temperature. The digital input signal received by the computer on conductor 22 is utilized in conjunction with the stored information of the resistance and temperature relationship of the thermistor to calculate an equivalent temperature, and the equivalent temperature accurately approximates the actual temperature to which the thermistor 12 is subjected. Signals representing the calculated equivalent temperature are supplied on conductors 24 to a display 26, where the calculated equivalent temperature is displayed in a manner which is perceptible by the user.

The microprocessor based computer 18 controls operation of the analog to digital converter 16 by supplying a control signal on conductors 28 to the converter 16. Upon receipt of the control signal, the converter 16 becomes operative to convert the analog input voltage to a digital output signal. Without application of the appropriate control signals on conductors 28, the converter 16 is inoperative to supply the digital signal on conductor 22 to the computer 18. The computer 18 also controls the multiplexing of the calculated equivalent temperature to the display 26 by delivering appropriate signals on conductors 30. A more detailed explanation of a preferred method of calculating the equivalent temperature can be obtained from the U.S. patent application for a LINEARIZED DIGITAL THERMOMETER, Ser. No. 867,127, filed concurrently herewith by the same inventor and assigned to the same assignee herein, the disclosure of which is hereby incorporated herein by reference.

Figure 3:
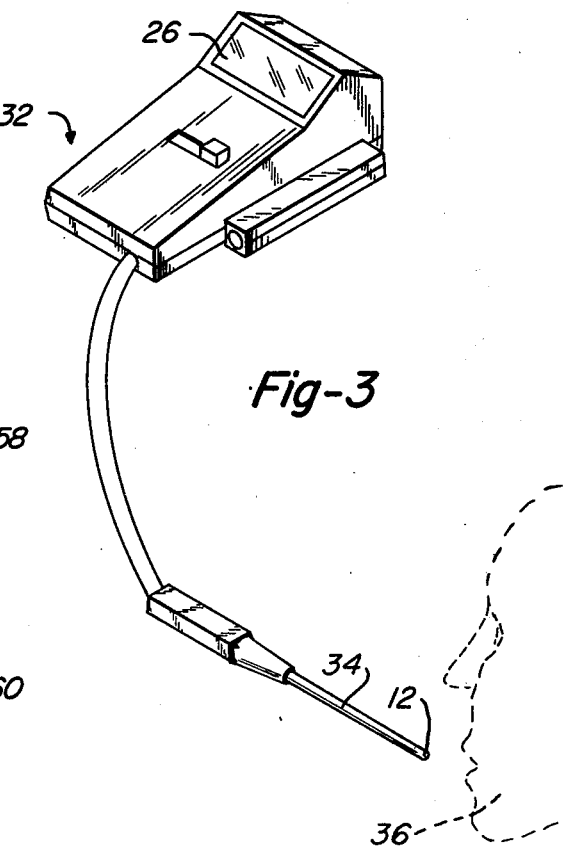
FIG. 3 is a perspective view of an exemplary clinical electronic thermometer suitable for taking the temperature of the human being, in which the present invention may be advantageously incorporated.

The electronic thermometer circuit shown in FIG. 1 is advantageously incorporated in a thermometer 32 such as that shown in FIG. 3. The thermometer 32 includes a probe 34 to which the thermistor 12 has been thermally attached, as for example with thermally conductive epoxy glue. The probe 34 is intended for insertion into or contact with the environment whose temperature is to be measured. The probe 34 is typically constructed of a number of metallic and other elements which are thermally conductive, and it is to these elements that the thermistor is thermally connected. One specific use of the thermometer 32 is in clinical or medical applications where the probe 34 is intended for insertion into a body cavity of an individual 36, typically into the mouth or oral cavity, for measuring the individual's body temperature.

Referring now to FIG. 1, to condition the probe with heat energy for the purpose of changing the temperature of the probe to a temperature generally approximating the temperature of the environment to be measured, there is provided a preheat circuit 40. The preheat circuit 40 is operatively controlled by the computer 18 through the delivery of control signals over conductor 42. The preheat circuit 40 is preferably a selectively controllable source of auxiliary current connected in parallel with the current source 14. Upon application of the control signal by the computer 18 on conductor 42, the auxiliary current source of the preheat circuit 40 becomes operative to deliver a flow of auxiliary heating current through the thermistor 12. The magnitude of auxiliary current is sufficient when flowing through the resistance inherent in the thermistor 12 to create sufficient heat energy to significantly raise the temperature of the probe. In this manner, the thermistor acts as a heating element for the probe.

Figure 2:
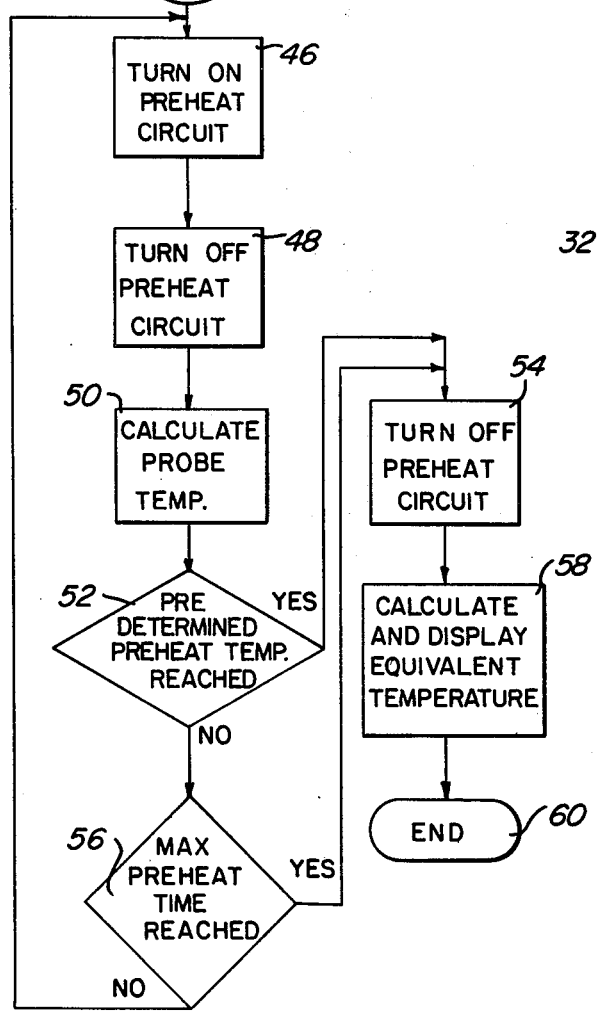
FIG. 2 is a flow diagram illustrating the operation of the thermometer shown in FIG. 1.

The computer 18, through application of the control signals on conductor 42, controls the preheat circuit 40 in a manner illustrated by the flow diagram of FIG. 2. At the beginning or start 44 of a temperature measuring process, the computer 18 supplies a control signal to activate or turn on the preheat circuit, described at 46. The preheat circuit is operative to supply the auxiliary current through the thermistor during the time it is turned on. At a predetermined time after the preheat circuit is turned on, for example, two seconds, the computer operatively turns off the preheat circuit, described at 48, thereby terminating the flow of auxiliary current through the thermistor 12. The computer 18 signals the analog to digital converter to provide a digital signal representative of the analog voltage across the thermistor as a result of the constant current source 14 supplying current to the thermistor. The digital signal is utilized by the computer to calculate the probe temperature, described at 50, immediately after the preheat circuit is turned off. The calculated probe temperature is compared within the computer to a preselected maximum preheat temperature desired, as is illustrated at 52. In medical applications, it has been found advantageous of the maximum probe temperature is selected to be a value greater than the normal human temperature, for example, 102° F. By heating the probe to approximately 102° F., the excess probe temperature is rapidly dissipated by the body tissues in the oral or other body cavity. If the calculated probe temperature equals or exceeds the preselected maximum probe temperature described at 52, the preheat circuit is permanently turned off as is described at 54. If the calculated probe temperature is less than the preselected maximum probe temperature, the amount of time during which the process of conditioning the probe with heat energy is determined as is described at 56. By controlling the preheat circuit in relation to a preselected maximum amount of time during which heat energy has been applied in conditioning the probe, the needless application of unneeded heat energy is avoided in certain situations. If the preselected maximum amount of time has been reached during which conditioning heat energy has been applied to the probe, as described at 56, the preheat circuit is turned off, as is described at 54. If the preselected maximum amount of time during which preheat energy has been applied has not been reached, the preheat circuit is turned on again as is described at 46.

The foregoing steps are repeated until either the preselected maximum probe temperature is reached (52) or the preselected maximum amount of time during which conditioning energy has been applied is reached (56). Upon achievement of either condition, the preheat circuit is permanently turned off (54) and the computer and analog to digital converter cooperatively calculate the equivalent temperature and display the equivalent temperature, as is described at 58. Thereafter, the temperature measurement process ends as is described at 60.

It is apparent from the foregoing description that the electronic thermometer advantageously conditions the probe with heat energy to change the probe temperature to a temperature generally approximating the temperature of the environment to be measured. Since the probe temperature is very close to the temperature of the environment, a very short time is required for the probe temperature to actually equalize to the environment temperature and thereby provide an accurate direct measurement of the environment temperature, since the probe temperature does not affect the temperature of the thermistor. This advantageous arrangement is particularly useful in taking the temperature of human beings, since the amount of time required for insertion of the probe into a body cavity is significantly reduced. In addition, the accuracy of temperature measurement is greatly enhanced since the need for prior art compensating and predicting type circuit arrangements is eliminated and an accurate and rapid direct reading thermometer is achieved.

The new and improved electronic thermometer with a heat conditioned probe has been described with a certain degree of particularity, but it should be understood that the present disclosure has been made by way of example and that changes in details of structure and function may be made without departing from the spirit of the invention.

I claim as my invention:

1. A method of decreasing the time required to obtain an accurate measurement of temperature from an electronic thermometer which employs a transducer thermally attached to a probe and wherein the transducer senses temperature to which it is subjected and provides a measurable electrical characteristic related to the temperature sensed, said method comprising the steps of:
    electrically applying preheat heat energy to the probe for a predetermined time period to change the temperature of the probe to a temperature generally approximating the temperature of the environment of be measured,
    sensing the temperature of the probe after the predetermined time period,
    comparing the sensed temperature of the probe with a predetermined preheat temperature,
    comparing the length of time during which preheat heat energy has been applied to the probe to a predetermined maximum time allowed for preheating the probe,
    permanently terminating the application of preheat heat energy if the sensed temperature approximately equals the predetermined value or if the length of time during which preheat energy has been applied equals or exceeds the predetermined maximum time allowed for preheating the probe, and
    thereafter measuring the temperature of the environment of the probe sensed by the transducer.

2. A method as recited in claim 1 wherein the step of applying preheat heat energy comprises the step of:
    providing an electronic element having heat conditioning capabilities when said electronic element is subjected to an electrical signal,
    positioning the electronic element on the probe, and
    subjecting the electronic element to an electrical signal.

3. A method as recited in claim 2 wherein the step of heating the probe comprises the steps of:
    providing an electronic element capable of generating heat when subjected to a current flow therethrough, and
    directing through the electronic element a current of a magnitude sufficient to generate heat to significantly raise the temperature of the probe.

4. A method as recited in claim 3 wherein the transducer comprises a thermistor, the electronic element also comprises the thermistor, and the current through the thermistor sufficient to generate heat to significantly raise the temperature of the probe is an auxiliary current.

5. A method of decreasing the time required to obtain an accurate measurement of temperature from an electronic thermometer which employs a thermistor thermally attached to a probe and wherein the thermistor senses temperature to which it is subjected and provides a variable resistance characteristic related to the temperature sensed, said method comprising the steps of:
    continuously directing a constant measurement current through the thermistor to thereby develop a voltage across the thermistor related to its temperature,
    directing an auxiliary current through the thermistor of sufficient magnitude to generate significant amounts of heat energy to change the temperature of the probe,
    terminating the flow of auxiliary current through the thermistor prior to the temperature of the probe reaching a preselected preheated temperature,
    measuring the probe temperature sensed by the thermistor by sensing the voltage across the thermistor while the auxiliary current is terminated,
    again directing an auxiliary current through from the temperature resulting after the measurement of the probe temperature,
    again terminating the flow of the second application auxiliary current through the thermistor, and again measuring the probe temperature sensed by the thermistor after termination of the second application of auxiliary current.

6. A method as recited in claim 5 comprising the further step of:
controlling the application of auxiliary current in relation to the temperature of the probe measured during termination of the auxiliary current.

7. A method as recited in claim 5 comprising the further step of:
controlling the application of auxiliary current in relation to the length of time which the auxiliary current has been directed through the thermistor.

8. A method as recited in claim 5 comprising the further step of:
controlling the application of auxiliary current both in relation to the length of time which the auxiliary current has been directed through the thermistor and in relation to the temperature of the probe measured during termination of the auxiliary current.

9. A method as recited in claim 5 comprising the further step of:
repeating the aforementioned steps if the measured temperature is less than the preselected temperature, and
terminating the repetition of the aforementioned steps approximately when measured temperature equals the preselected temperature.

10. A method as recited in claim 9 comprising the further step of:
repeating the aforementioned steps for a preselected time period, and
terminating the repetition of the aforementioned steps after expiration of the preselected time period.

11. A method as recited in claim 5 comprising the further step of:
repeating the aforementioned steps for a predetermined time period, and
terminating the repetition of the aforementioned steps after expiration of the preselected time period.

12. A thermometer for measuring the temperature of an environment, comprising:
probe means for insertion into an environment whose temperature is to be measured;
a thermistor thermally attached to said probe means, said thermistor having a resistance characteristic which varies in predetermined relation to its temperature;
means electrically connected to said thermistor for supplying a constant measurement current through said thermistor and thereby creating a voltage across said thermistor in relation to its resistance;
converter means electrically connected to said thermistor for converting the magnitude of the voltage across said thermistor into a signal representative of the voltage;
a source of auxiliary current electrically connected to conduct auxiliary current through said thermistor, said auxiliary current source is selectively controllable to supply the auxiliary current; and
control means operatively connected for controlling said auxiliary current source to conduct auxiliary current through said thermistor for a first predetermined time and to terminate conduction of auxiliary current through said thermistor for a second time period, the aforesaid events of one application and immediately following termination of the flow of auxiliary current defining one preheat cycle, said control means selectively repeating the preheat cycle in a series until the occurrence of predetermined events and thereafter permanently terminating the occurrence of preheat cycles.

13. A thermometer as recited in claim 12 wherein said control means further comprises:
computer means electrically connected for operatively controlling said converter means and said auxiliary current source, said computer means operatively controlling said converter means to supply the signal representative of the voltage across said thermistor during the second time period.

14. A thermometer as recited in claim 13 wherein said computer means operatively controls said auxiliary current source to supply auxiliary current for no greater than a preselected preheat time period.

15. A thermometer as recited in claim 13 wherein said computer means operatively terminates the supply of auxiliary current from said auxiliary current source upon the temperature of said probe means reaching a preselected preheat temperature.

16. A thermometer as recited in claim 13
said computer means is electrically connected with said converter means for receiving the signal from said converter means and for calculating an equivalent temperature based on the signal.

17. A thermometer as recited in claim 16 wherein said computer means further stores predetermined information relating to the relationship of resistance and temperature of said thermistor and utilizes said predetermined information to calculate the equivalent temperature.

18. A thermometer as recited in claim 17 for measuring the temperature of a human being, and wherein said probe means is adapted for insertion into a body cavity of the human being.

19. A thermometer as recited in claim 13 wherein said computer means further functions during the repetition of the preheat cycles to:
calculate the temperature of the probe from the signal supplied by said converter means,
compare the temperature calculated to a preselected preheat temperature, and
compare the time during which preheat cycles have been repeated to a preselected preheat time period.

20. A thermometer as recited in claim 19 wherein said computer means further permanently terminates the repetition of the preheat cycles upon occurrence of either the temperature calculated equalling or exceeding the preselected preheat temperature or the time during which preheat cycles have been repeated equalling or exceeding the preselected preheat time period.

21. A method as recited in claim 5 wherein the preselected preheated temperature is greater than the anticipated actual temperature to be measured.

* * * * *